(12) United States Patent
Benedid (10) Patent No.: US 10,151,097 B2
(45) Date of Patent: Dec. 11, 2018

(54) SEWER LINE ROOT CLEANING AND REPAIR SYSTEM

(71) Applicant: Osvaldo Benedid, Gardena, CA (US)

(72) Inventor: Osvaldo Benedid, Gardena, CA (US)

( * ) Notice: Subject to any disclaimer, the term of this patent is extended or adjusted under 35 U.S.C. 154(b) by 575 days.

(21) Appl. No.: 14/857,327

(22) Filed: Sep. 17, 2015

(65) Prior Publication Data
US 2017/0081834 A1    Mar. 23, 2017

(51) Int. Cl.
| F16L 55/18 | (2006.01) |
| --- | --- |
| E03F 3/06 | (2006.01) |
| E03F 9/00 | (2006.01) |
| F16L 55/1645 | (2006.01) |
| B08B 9/051 | (2006.01) |
| F16L 55/26 | (2006.01) |
| F16L 55/40 | (2006.01) |
| F16L 101/12 | (2006.01) |

(52) U.S. Cl.
CPC ............... *E03F 3/06* (2013.01); *B08B 9/051* (2013.01); *E03F 9/002* (2013.01); *F16L 55/1645* (2013.01); *F16L 55/18* (2013.01); *E03F 2003/065* (2013.01); *F16L 55/265* (2013.01); *F16L 55/40* (2013.01); *F16L 2101/12* (2013.01)

(58) Field of Classification Search
CPC ........ F16L 55/18; F16L 55/1645; B08B 9/051
See application file for complete search history.

(56) References Cited

U.S. PATENT DOCUMENTS

| 2,275,850 A * | 3/1942 | Gardner | E03F 9/002 |
| --- | --- | --- | --- |
| | | | 15/104.33 |
| 2,597,263 A | 5/1952 | Rodgers | |
| 3,004,278 A | 10/1961 | Stanley | |
| 3,267,504 A | 8/1966 | Cook et al. | |
| 4,011,100 A | 3/1977 | Ross | |
| 4,473,921 A | 10/1984 | Weber et al. | |
| 5,418,997 A | 5/1995 | DeFrange | |

(Continued)

FOREIGN PATENT DOCUMENTS

| EP | 1052032 A1 * | 11/2000 | ............. B08B 9/051 |
| --- | --- | --- | --- |
| WO | WO 0114073 A1 * | 3/2001 | ............. B08B 9/0433 |

OTHER PUBLICATIONS

Sewer Drill Pipe Repair—Tunnel Machine / Hokuryo Co. Ltd. / http://www.alibaba.com/product-detail/sewer-drill-pipe-repair-tunnel-machine_143299732.html.

*Primary Examiner* — Michael Jennings
(74) *Attorney, Agent, or Firm* — Robert J. Lauson; Lauson & Tarver LLP (57) ABSTRACT

A sewer line root cleaning and repair system includes a root cleaner having a first body and a second body connected by a flexible connector. A flexible rotating member extending from a pneumatic motor in the first body extends through the flexible connector and the second body. The flexible rotating member terminates beyond the second body in a series of bristles. As the root cleaner moves through a sewer line a set of wheels on the first body extends outward, centering the first body in the sewer line as the bristles spin at high RPM centering the second body in the sewer line and scouring the sewer line free of roots including small root hairs. Afterward, a coating sprayer is inserted into the sewer line, connected to a coating supply and air supply, and the coating is sprayed under pressure to line the inner surface of the sewer line.

8 Claims, 6 Drawing Sheets

(56) References Cited

U.S. PATENT DOCUMENTS

| | | | |
|---|---|---|---|
| 5,528,789 A * | 6/1996 | Rostamo | B08B 9/049 |
| | | | 15/104.09 |
| 5,588,171 A | 12/1996 | Hamann | |
| 5,735,016 A * | 4/1998 | Allen | B08B 9/047 |
| | | | 134/113 |
| 6,269,519 B1 * | 8/2001 | Harvey | B08B 9/047 |
| | | | 15/383 |
| 7,040,331 B2 | 5/2006 | Garman et al. | |
| 8,347,445 B2 * | 1/2013 | Park | A46B 5/0095 |
| | | | 15/104.05 |
| 8,650,696 B1 | 2/2014 | Morales et al. | |
| 8,739,354 B2 * | 6/2014 | Buckner | E02F 3/384 |
| | | | 134/168 C |
| 2010/0139019 A1 | 6/2010 | Geppert et al. | |
| 2015/0375276 A1 * | 12/2015 | Sivacoe | B08B 9/049 |
| | | | 15/104.09 |

\* cited by examiner

SEWER LINE ROOT CLEANING AND REPAIR SYSTEM

BACKGROUND

Modern drainage and sewage systems are closed pipe systems connecting drains in residential or commercial structures to municipally maintained sewer mains. Maintenance of these systems is typically the responsibility of the property owner or community association rather than a municipality. While small structural pipe clogs typically occur due to debris entering an interior drain, larger exterior underground sewage pipes between the structure and a sewer main usually become clogged by roots entering through cracks that develop in pipes over time. As the roots grow in the pipe, they trap additional material, thereby occluding the pipe. Unclogging large underground pipes is a time consuming and expensive process.

Root cleaners are known in the art. These apparatus, typically consist of drum augers having a spooled heavy gauge cable affixed to a rotating motor. The cable is affixed at one end with a bladed head or similar cutting structure designed to cut through roots and other debris. As the rotating cable is fed into a sewer line, the turning blades cut away roots and other blockage. While conventional drum augers are useful for cutting and clearing large roots and debris, they rotate at relatively slow speeds and are typically equipped with cutting heads smaller in diameter than the pipe being cleaned. The result is that small root fibers at fissures in the pipe are left behind, and ultimately re-grow to cause future blockage.

Repairing cracked pipes by various lining techniques are also known in the art. Alternatively referred to as "trenchless" repair, these processes involve installing an in situ cured resin or resin-like material along the inner wall of a sewage pipe. The resin is sprayed or otherwise administered to the interior surface of the sewer line. While trenchless repair and installation and produce an interior liner that effectively covers cracks and fissures, occasionally small root fibers extend through the coating and survive, allowing roots to re-grow, spreading cracks through the lining, and shortening its operational life.

There is therefore a need for a sewer line root cleaning and repair system that prepares a sewer line for effective trenchless re-lining by completely scouring the inside of the sewer line of all debris including fine root hairs. There is also a need for a root cleaning and repair system capable of maneuvering around turns and across pipe junctions without becoming stuck on pipe fittings and other obstacles. There is also a need for a root cleaning and repair system which is impervious to water contamination, and avoids problems inherent in using electrically powered components in a wet environment. There is also a need for a root cleaning and repair system that is lightweight and easy to use, that stores conveniently and portably when not in use, and that may be easily connected to and disconnected from conventional pressurized air lines.

These and other objects and advantages of the invention are more fully discussed in the following description, drawings and claims.

SUMMARY

A sewer line root cleaning and repair system includes a root cleaner for clearing a sewer line. The root cleaner includes a first body with at least one first wheel and a motor housed in the first body. A second body is flexibly coupled to the first body by a flexible connector. The second body includes at least one a second wheel. A flexible rotating member having a first end coupled to the motor, extends through the second body and includes a second end coupled to at least one bristle. The motor governs rotational movement of the flexible rotating member, and the second body forms a bearing for the flexible rotating member. Rotational movement in the flexible rotating member drives the bristle against the sewer line, thereby clearing the sewer line.

The root cleaner includes a flexible pneumatically pressurized line coupled to the first body to supply air to the motor, which is preferably pneumatic. The first body may include multiple opposing first wheels which are retractable and biased to an extended position to preserve the first body in the center of the sewer line. The flexible connector between the first body and the second body encloses the flexible rotating member, and the rotating member preferably includes an adjustable hub anchoring the bristle to the second end of the flexible rotating member. At the end of the bristle, where contact with the sewer line walls is made, the bristle preferably is frayed for improved scouring. In a preferred embodiment, multiple bristles are used.

The bristle is preferably anchored to the flexible rotating member near a midpoint of the bristle. The first body and the second body preferably include guides for distancing the first body and the second body away from the sewer line. Fasteners may also be included for holding the first body in position around the motor.

Once the sewer line is cleaned of fine root hairs, a liner sprayer having a first sprayer body and a second sprayer body connected by a second flexible connector is inserted into the sewer line. The second body terminates in a sprayer nozzle opposite the second flexible connector, and the sprayer nozzle configured to produce a hollow cone spray pattern. A pressurized air supply and resin supply is connected to the liner sprayer and resin is sprayed through the liner sprayer to coat the interior surface of the sewer line. The liner sprayer is then removed and once the resin cures, the sewer line is ready for use with a greatly extended serviceable life.

DESCRIPTION

Figure 1:
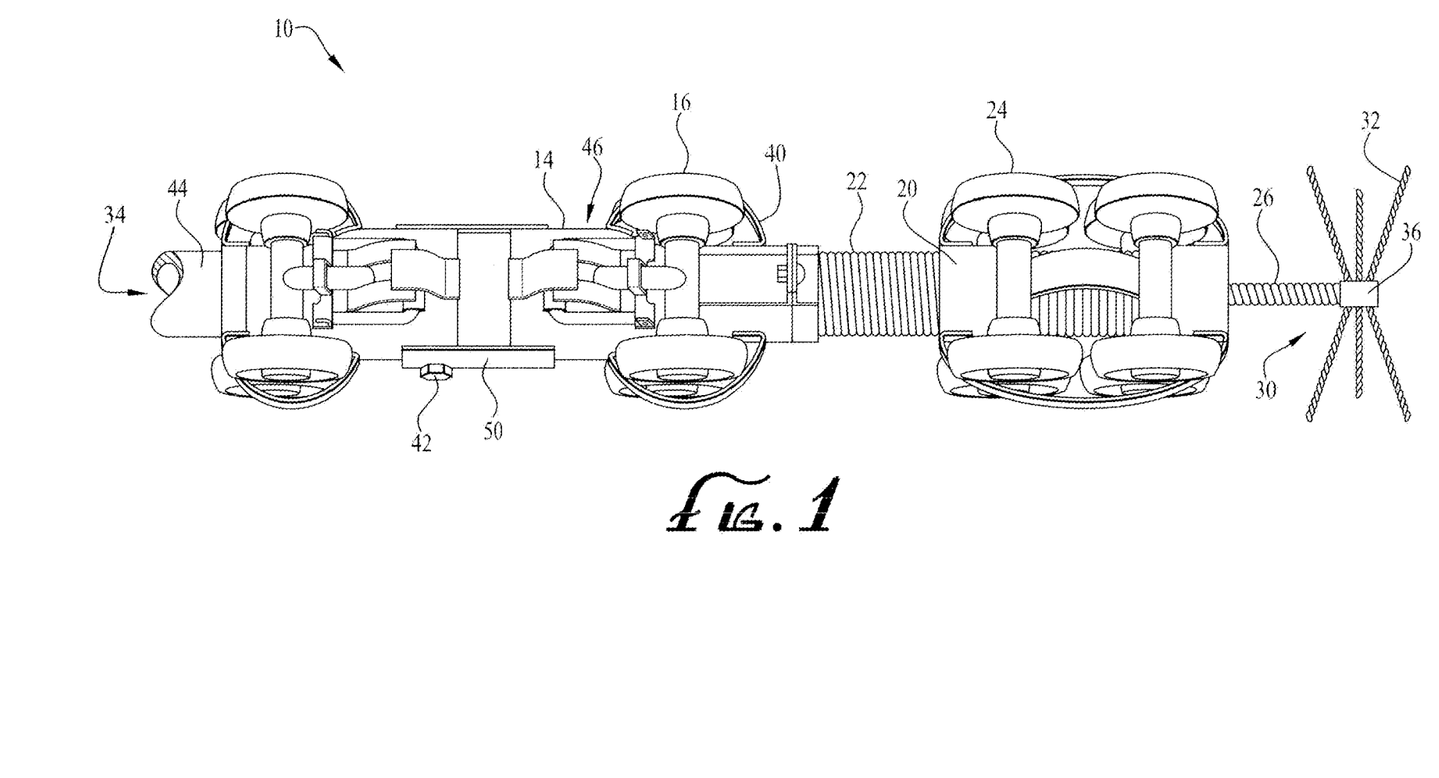
FIG. 1 illustrates a perspective view of a root cleaner of the sewer cleaning system.
Figure 2:
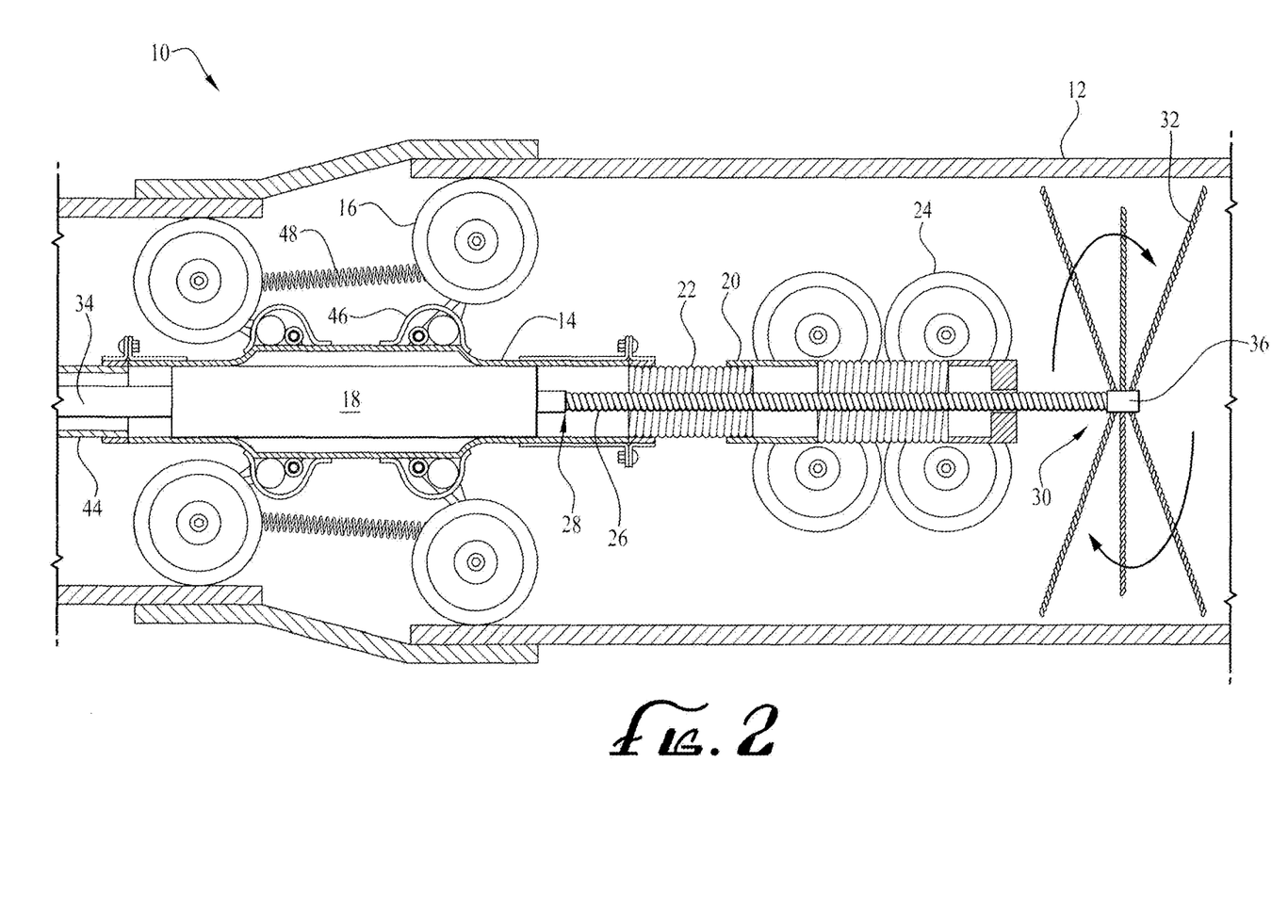
FIG. 2 illustrates a section view of the root cleaner operating in a sewer line.

Referring to FIGS. 1 and 2, a root cleaner 10 for a sewer line 12 includes a first body 14. The first body 14 includes at least one first wheel 16 and a motor 18. The motor 18 is preferably a pneumatic motor 18 translating air pressure into rotational motion at hundreds or thousands of revolutions per minute. The root cleaner 10 also includes a second body 20 connected to the first body 14 by a flexible connector 22. The flexible connector 22 may be a heavy gauge helical wire, or similar resiliently bendable material. The second body 20 has at least one second wheel 24, substantially similar to the first wheel 16. The second body 20 also serves as a bearing for a rotating member 26.

The rotating member 26, which may be a heavy gauge wire or cable, has a first end 28 coupled to the motor 18, which imparts rotational motion to the rotating member 26, and a second end 30 coupled to a bristle 32. Air pressure from a pressurized line 34 inside a sleeve 44 causes the motor 18 to turn the rotating member 26, which drives the bristle 32 around the inside of the sewer line 12. To prevent damage to the pressurized line 34, including undue bending, the pressurized line 34 may be housed in a sleeve 44.

In order to center the bristle 32 on the rotating member 26, to install multiple bristles 32, or to replace bristles 32 at the end of their operational life, an adjustable hub 36 may be included at the second end 30 of the rotating member 26. The adjustable hub 36 may also be useful for preserving a bristle 32 in place where the bristle 32 extends through the adjustable hub 36, and anchors to the adjustable hub 36 at a midpoint of the bristle 32.

Still referring to FIGS. 1 and 2, the first body 14 and the second body 20 also include guides 40 to help avoid obstructions (not shown) in the sewer line 12 from catching on the first wheels 16 or second wheels 24. The first wheels 16 and the second wheels 24 may be tapered to further prevent catching, and to compliment the curved interior of the sewer line 12. Preferably the first wheels 16, and optionally the second wheels 24 are extendable and retractable on swinging axle assemblies 46, allowing them respectively to ride closer to, or farther away from the first body 14, and optionally, the second body 20.

Unlike the second body 20, which has a relatively open configuration, the first body 14 preferably completely encases the motor 18, but includes a fastener 42 allowing the first body 14 to be opened and the motor 18 replaced if needed. The pressurized line 34 for supplying pressurized air to the motor 18 is preferably detachable from the first body 14 via a quick-connect mechanism, typical of pneumatic tools.

Figure 3:
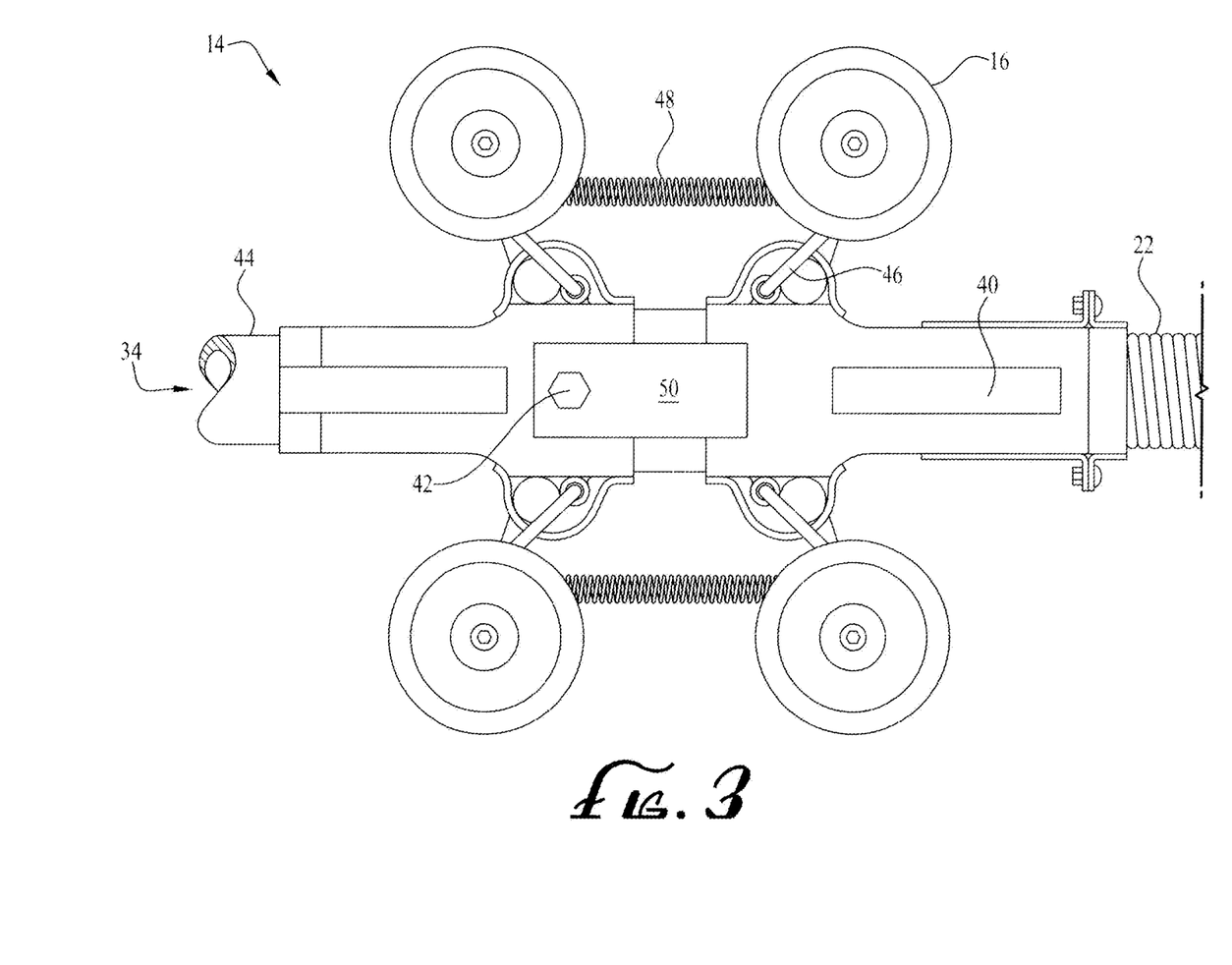
FIG. 3 illustrates a side view of a first body of the root cleaner with extended wheels.

Referring to FIG. 3, the first body 14 is shown with the first wheels 16 extended. Since the first body 14 is the longest non-bendable portion of the root cleaning and repair system, maintaining the first body 14 centrally in the sewer line 12 (not shown) is necessary to maneuver through bends in its pipes and junctions. As discussed, the first wheels 16 are mounted on swinging axle assemblies 46, which allow the first wheels 16 to move closer to or away from the first body 14.

To accomplish centering, springs 48 are coupled to the swinging axle assemblies 46, biasing them to an extended position as shown. In the illustrated embodiment the springs 48 are connected between axle assemblies 46. In other embodiments, the springs 48 may be connected between an axle assembly 46 and the first body 14. When the first wheels 16 are forced closer to the first body 14 due to the confines of the sewer line 12, the guides 40 help center the first body 14 and prevent the first wheels 16 from catching on pipe junctions (not shown) and other objects in the sewer line 12.

Since the motor 18 (not shown) is cylindrical, the first body 14 preferably conforms to the motor 18, and is shaped as cylindrical canister. To allow disassembly of the first body 14, while also achieving the lowest profile, a fastener 42 is positioned to engage a spanning plante 50, arced in the profile of the first body 14, oriented lengthwise and parallel to the root cleaner's 10 direction of travel.

Figure 4:
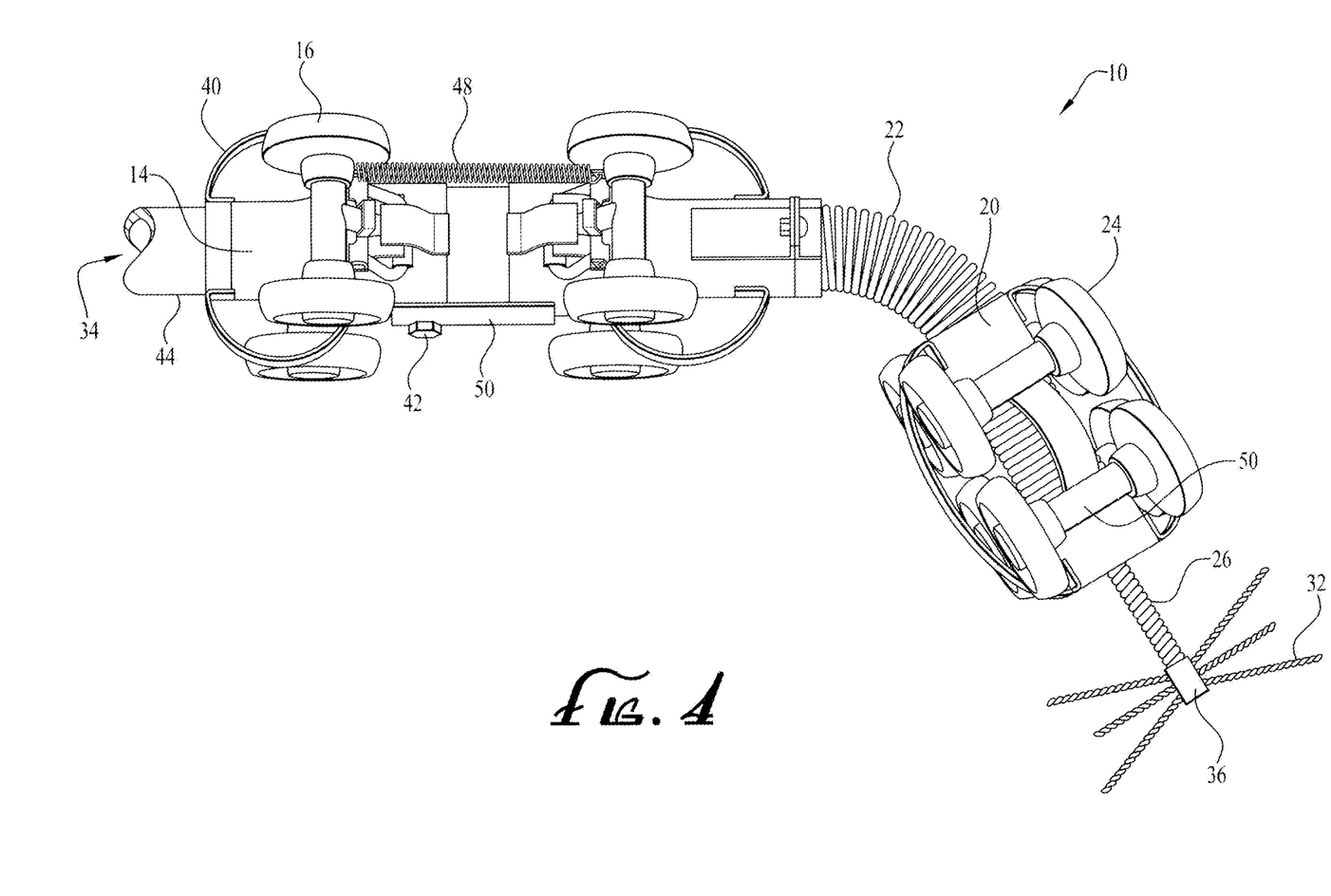
FIG. 4 illustrates a flexible connection between the first body and a second body.

Referring to FIG. 4, the root cleaner 10 is shown with the second body 20 articulating relative to the first body 14 at the flexible connector 22. This ability to bend allows the root cleaner 10 to navigate around multiple turns, including upwards of forty five degree turns at pipe connections in the sewer line 12 (not shown). Because the rotating member 26 is also flexible, it will accommodate flexing of the flexible connector 22. Preferably the material comprising the rotating member 26 allows it to bend smoothly while in rotational motion, thereby allowing continuous operation in the sewer line 12.

Although the first body 14 preferably includes articulating axle assemblies 46 and springs 48, the second body 20 may incorporate conventional axles 50. When the rotating member 26 is in motion, the bristles 32 tend to center the second body 20 in the sewer line 12 due to centrifugal forces and even pressure around the bristles 32, avoiding the need for the second wheels 24 to engage the sewer line 12 on articulating axle assemblies 46. Having conventional axles 50 also reduces the number of moving parts and risk of parts of the root cleaner 10 breaking.

Figure 5:
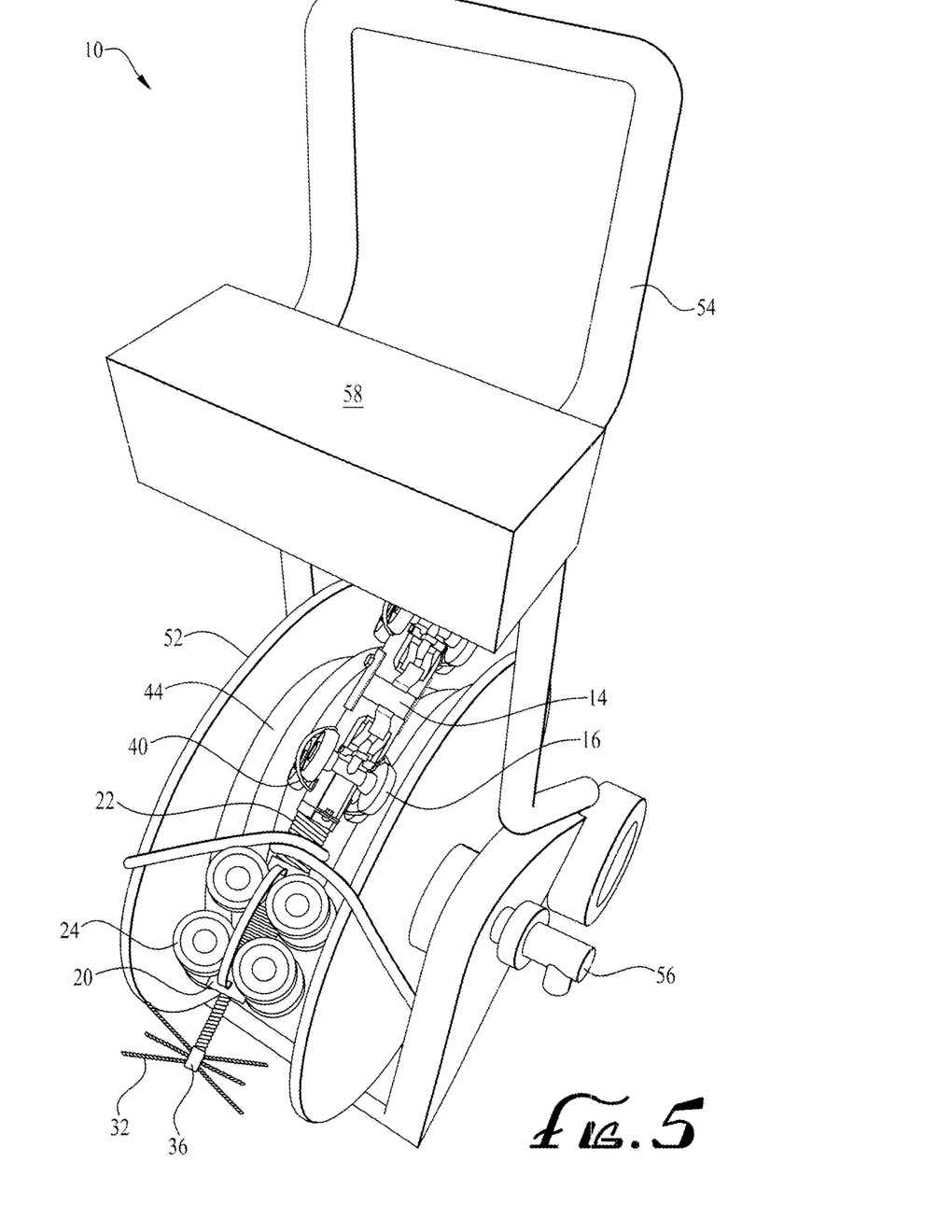
FIG. 5 illustrates a spool on which the root cleaner is stored before and after use.

Referring to FIG. 5, the sleeve 44 containing the pressurized line 34 (not shown), the first body 14 and the second body 20 are installed on a spool 52, which is held on a wheeled cart 54, allowing the root cleaner 10 to be easily moved from place to place. Preferably the spool 52 includes an easily accessible pneumatic valve 56, allowing a user to easily couple and de-couple an air compressor (not shown) to the pressurized line 34. The wheeled cart 54 preferably also may include a tool box 58 for containing parts and equipment (not shown), for example different types and sizes of bristles, an extra motor, etc., making the root cleaner 10 fully self contained.

Figure 6:
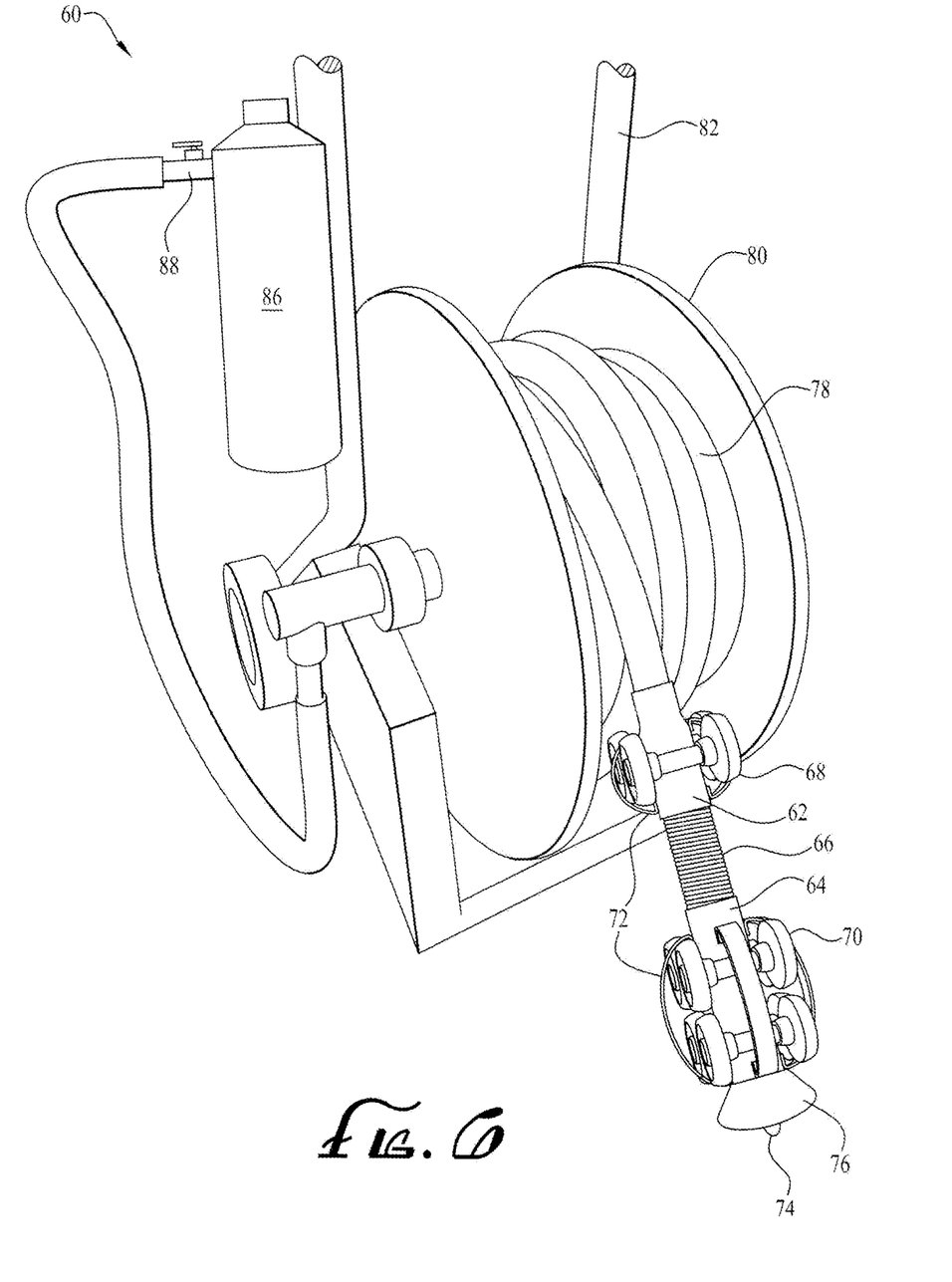
FIG. 6 illustrates a trenchless lining apparatus having two chassis separated by a flexible connection.

Referring to FIG. 6, in addition to the root cleaner 10 (not shown), the sewer cleaning and repair system includes a trenchless sewer liner sprayer 60. Similar to the root cleaner 10, the sewer liner sprayer 60 includes a first sprayer body 62 and a second sprayer body 64 connected by a second flexible connector 66 to allow the sewer liner sprayer 60 to travel through pipe bends (not shown). First sprayer wheels 68 are mounted on the first sprayer body 62 and second sprayer wheels 70 are mounted on the second sprayer body 64, allowing the sewer liner sprayer 60 to roll over debris. Sprayer guides 72 are included to prevent the first sprayer wheels 68 and the second sprayer wheels 70 from lodging on obstructions (not shown).

A sprayer nozzle 74 extends from the second sprayer body 64 for spraying liner resin (not shown) across the inner surface of a sewer pipe (not shown). To prevent the liner resin from contaminating the sewer liner sprayer 60, in particular moving parts, such as the first sprayer wheels 68 and second sprayer wheels 70, a cone 76 extends forward around the sprayer nozzle 74. A coating such as liner resin for example is fed through the sewer liner sprayer 60 by a coating line 78, which also travels through the first sprayer body 62, second flexible connector 66 and second sprayer body 64 before terminating at the sprayer nozzle 74 where it is ejected as a hollow cone.

The coating line 78 is preferably stored on a sprayer spool 80, mounted on a wheeled sprayer cart 82. Like the wheeled cart 54 of the root cleaner 10, the wheeled sprayer cart 82 also preferably includes a sprayer tool box 84 having parts and equipment (not shown) useful for maintaining and repairing the sewer liner sprayer 60. A liner resin tank 86 is also mounted on the sprayer cart 82, with a fluid valve 88 used to ensure the right pressure of liner resin (not shown) entering the liner resin tank 86 and subsequently the coating line 78.

Because liner resin is mixed with pressurized air prior to expulsion through the sprayer nozzle 74, the sprayer cart 82 also has a pneumatic valve 56 for attaching a pressurized air line (not shown). Preferably the same type of pneumatic valve 56 will be used for the liner sprayer 60 and the root cleaner 10, enabling the same pressurized air line to be used for both apparatus.

The structure of the sewer line root cleaning and repair system having been shown and described, its method of use will now be discussed.

Referring to FIGS. 1-6, in order to use the system, a user wheels the root cleaner 10 on its cart 54 to a sewer line 12 clean-out (not shown) or similar access point. A pressurized air source, such as an air compressor hose (not shown) is attached to the pneumatic valve 56. The pneumatic valve 56 may be coupled to a control (not shown) for controlling air pressure in the pressurized line 34, and thus, the speed of the bristles 32. Prior to activation, with the pneumatic valve closed, the bristles 32 may be adjusted on the adjustable hub 36 as desired, or may be removed and replaced with new or appropriately sized alternative bristles 32.

The root cleaner 10 is then unspooled and fed down the sewer line 12, with air pressure raised in the pressurized line 34 as desired to activate the root cleaner 10 and control rotational speed. Pressurized air (not shown) travels through the pressurized line 34 and enters the first body 14, encountering the motor 18 therein. The motor 18 translates air pressure into rotational movement, causing the rotating member 26 to rotate up to thousands of RPM depending on the air pressure in the pressurized line 34.

As the motor 18 rotates, the rotating member 26 rotates in tandem, extending through the flexible connection 22 and through the second body 20, which essentially acts as a bushing to ensure smooth operation. The rotating member 26, terminating in front of the second body 20, rotates the bristles 32 at a high rate of speed. With the bristles 32 rotating at a speed sufficient to scour interior surfaces, the root cleaner 10 is fed along the sewer line 12. As the root cleaner 10 encounters corners and turns, the flexible connector 22 allows the second body 20 to bend relative to the first body 14 and maneuver through numerous convolutions in the sewer line 12. As the sewer line 12 increases and decreases in diameter, the axle assemblies 46 cause the first wheels 16 to extend outward from the first body 14 and retract toward it as necessary.

As the bristles encounter roots, root fibers, or other intrusive objects, they scrape them away, scouring the sewer line 12 to a smooth polished surface. Once the intended portion of the sewer line 12 is cleaned of roots, the pneumatic valve 56 is closed, air pressure bled from the pressurized line 34, and the root cleaner 10 is removed from the sewer line 12 as a user rolls it back up on the spool 52. The cart 54 may then be moved and stored for future use.

With the sewer line cleaned, the user then maneuvers the sprayer cart 82 into position at the access point. Before or after inserting the line sprayer 60, the user attaches the pressurized air source to the pneumatic valve 56 on the sprayer spool 80. The user may also connect a coating supply such as liner resin to the coating line 78, filling the liner resin tank 86. The liner sprayer 60 is fed down the sewer line to the area intended to be lined with resin. As the liner sprayer 60 moves through the sewer line, the first sprayer wheels 68 and second sprayer wheels 70 help guide it along the way, with the sprayer guides 72 preventing them from being obstructed.

To activate the liner sprayer 60, air and liner resin are forced through the coating line 78, passing through the first sprayer body 62, the second flexible connector 66 and the second sprayer body 64. The pressurized mixture passes through the sprayer nozzle 74, forming a hollow cone that coats the entire inner surface of the sewer pipe with liner resin to a desired thickness. The sprayer cone prevents atomized resin sprayed from the sprayer nozzle 74 from contaminating moving parts of the liner sprayer 60, such as the first sprayer wheels 68 and second sprayer wheels 70.

Once the liner resin is sufficiently applied, the user closes the fluid valve 88 to stop the resin supply and closes the pneumatic valve 56 to stop the flow of pressurized air. The user then withdraws the liner sprayer 60 by rolling the coating line 78 up on the sprayer spool 80. With the sewer line scoured of fine root hairs and a smooth coat of liner resin applied over fractured portions of the sewer pipe, the serviceable life of the sewer line is greatly extended.

The foregoing description of the preferred embodiment of the Invention is sufficient in detail to enable one skilled in the art to make and use the invention. It is understood, however, that the detail of the preferred embodiment presented is not intended to limit the scope of the invention, in as much as equivalents thereof and other modifications which come within the scope of the invention as defined by the claims will become apparent to those skilled in the art upon reading this specification.

What is claimed is:

1. A sewer line root cleaning and repair system, comprising:
    a root cleaner having a first body and a second body coupled by a flexible connector;
    the first body housing a motor coupled to a rotating member;
    the rotating member extending from the first body, through the flexible connector and extending through the second body, wherein the second body steadies the rotating member;
    the rotating member terminating at a bristle transversely coupled to the rotating member wherein rotational movement of the rotating member imparted by the motor causes the bristle to scour the sewer line; and
    a liner sprayer having a first sprayer body and a second sprayer body coupled by a second flexible connector;
    the second body terminating in a sprayer nozzle opposite the second flexible connector, the sprayer nozzle configured to produce a hollow cone spray pattern.

2. The root cleaner of claim 1 wherein the first body includes a first wheel biased away from the first body, and the first sprayer body includes a first sprayer wheel.

3. The root cleaner of claim 1 wherein the second body includes a second wheel and the second sprayer body includes a second sprayer wheel.

4. The root cleaner of claim 1 wherein the bristle is coupled to the rotating member proximate a midpoint of the bristle.

5. The root cleaner of claim 1 wherein the motor is a pneumatic motor coupled to a pneumatically pressurized line.

6. The root cleaner of claim 1 including an adjustable hub for adjusting the position of the bristle relative to the rotating member.

7. The root cleaner of claim 1 including a spool for holding the root cleaner.

8. The root cleaner of claim 7 wherein the spool includes a pressure valve for governing air pressure in the motor.

* * * * *